(12) United States Patent
Baxley et al.

(10) Patent No.: US 6,646,997 B1
(45) Date of Patent: Nov. 11, 2003

(54) LARGE-SCALE, FAULT-TOLERANT AUDIO CONFERENCING IN A PURELY PACKET-SWITCHED NETWORK

(75) Inventors: Warren E. Baxley, Arvada, CO (US); Gregory A. Clemson, Superior, CO (US); William P. Ernstrom, Golden, CO (US); Eric J. Nylander, Morrison, CO (US); Thomas W. Stark, Englewood, CO (US); Thomas E. Yackey, Jr., Broomfield, CO (US)

(73) Assignee: Voyant Technologies, Inc., Westminster, CO (US)

( * ) Notice: Subject to any disclaimer, the term of this patent is extended or adjusted under 35 U.S.C. 154(b) by 0 days.

(21) Appl. No.: 09/426,684

(22) Filed: Oct. 25, 1999

(51) Int. Cl.[7] .......................... H04L 12/16; H04Q 11/00

(52) U.S. Cl. ................. 370/260; 370/261; 379/202.01; 709/204

(58) Field of Search ................................ 370/260, 261, 370/263; 379/202.01; 709/204, 227; 455/416

(56) References Cited

U.S. PATENT DOCUMENTS

| | | |
|---|---|---|
| 4,541,087 A | 9/1985 | Comstock |
| 5,054,021 A | 10/1991 | Epps |
| 5,103,444 A | 4/1992 | Leung et al. |
| 5,127,001 A | 6/1992 | Steagall et al. |
| 5,812,652 A | 9/1998 | Jodoin et al. |
| 5,841,763 A * | 11/1998 | Leondires et al. ........... 370/260 |
| 5,909,431 A | 6/1999 | Kuthyar et al. |
| 5,909,543 A | 6/1999 | Tanaka et al. |
| 5,916,302 A | 6/1999 | Dunn et al. |

(List continued on next page.)

OTHER PUBLICATIONS

About OnLive ACS 300, Internet Article, http://www.onlive.com/prod/acs300/about.html, Sep. 13, 1999, pp. 1–3.

A Primer on the H.323 Series Standard, Internet Article, http://www.cs.ucl.ac.uk/staff/jon/jip/h323/h323_primer.html Sep. 10, 1999, pp. 1–18.

Confertech International, SonataTeleconferencing System, The Choice for large–scale applications, brochure, Jun. 1997, Westminster, Colorado.

Confertech International, Allegro Teleconferecning System, brochure, Nov. 1996, Westminster, Colorado.

Confertech International, Call Express, brochure, Aug. 1996, Westminster, Colorado.

*Primary Examiner*—Wellington Chin
*Assistant Examiner*—Chirag Shah
(74) *Attorney, Agent, or Firm*—Dorr, Carson, Sloan & Birney, P.C.

(57) ABSTRACT

A method of large-scale fault-tolerant audio conferencing in an audio conferencing system using a purely packet-switched network. An endpoint places a call to a conference gatekeeper indicating an audio conference. The conference gatekeeper determines whether the call contains sufficient information to establish the audio conference. If there is insufficient information, the endpoint is connected to an IVR server that obtains sufficient information from the endpoint. Either way, a CACS selects an MCU hosting or that will host the audio conference. The CACS then responds to the endpoint with routing instructions indicating the selected MCU and the endpoint connects or transfers to the selected MCU. The MCU mixes input from all endpoints in the audio conference to form a voice stream, which is then returned to each endpoint in the audio conference. Audio conference participants can dial-out from the MCU to bring additional participants into the audio conference. Once established, the audio conference supports full service audio conferencing. In addition, dynamic routing permits an operator to service multiple MCUs, and an audio conference participant and/or an entire audio conference to be moved between MCUs. The audio conference can also be broadcast from a streaming protocol server to passive participants.

29 Claims, 6 Drawing Sheets

U.S. PATENT DOCUMENTS

| | | |
|---|---|---|
| 5,917,822 A | 6/1999 | Lyles et al. |
| 5,943,321 A | 8/1999 | St-Hilaire et al. |
| 5,949,763 A | 9/1999 | Lund |
| 5,950,165 A | 9/1999 | Shaffer et al. |
| 5,978,463 A * | 11/1999 | Jurkevics et al. ...... 379/202.01 |
| 5,995,608 A | 11/1999 | Detampel, Jr. et al. |
| 6,006,253 A * | 12/1999 | Kumar et al. ............... 709/204 |
| 6,122,665 A * | 9/2000 | Bar et al. .................... 709/224 |
| 6,181,786 B1 * | 1/2001 | Detampel, Jr. et al. . 379/205.01 |
| 6,202,084 B1 * | 3/2001 | Kumar et al. ............... 709/204 |
| 6,298,062 B1 * | 10/2001 | Gardell et al. .............. 370/401 |
| 6,374,302 B1 * | 4/2002 | Galasso et al. ............. 709/238 |
| 6,404,745 B1 * | 6/2002 | O'Neil et al. ............... 370/260 |
| 6,421,339 B1 * | 7/2002 | Thomas ....................... 370/352 |
| 6,457,043 B1 * | 9/2002 | Kwak et al. ................. 709/204 |
| 6,490,275 B1 * | 12/2002 | Sengodan .................... 370/356 |
| 2001/0002927 A1 * | 6/2001 | Detampel, Jr. ............. 379/202 |
| 2002/0001302 A1 * | 1/2002 | Pickett ....................... 370/352 |

* cited by examiner

Fig. 6

LARGE-SCALE, FAULT-TOLERANT AUDIO CONFERENCING IN A PURELY PACKET-SWITCHED NETWORK

RELATE APPLICATION

This application is related to co-owned U.S. patent application entitled "LARGE-SCALE, FAULT-TOLERANT AUDIO CONFERENCING OVER A HYBRID NETWORK," Ser. No. 09/426,382, filed on the same date as this application.

BACKGROUND OF THE INVENTION

1. Field of the Invention

The present invention relates generally to the field of packet-switched network audio conferencing. More specifically, the present invention discloses a method for large-scale, fault-tolerant audio conferencing in a purely packet-switched network.

2. Statement of the Problem

The most common method to route calls for an audio conference is to control a local switch in a GSTN (globally switched telephony network). That is, a physical point-to-point connection is made between each piece of equipment in the network to create an overall point-to-point audio connection for the call. However, such a switch-controlled application can only route calls to devices connected to the switch, limiting the overall size of the system and limiting the geographic distribution of multipoint control units (MCUs) within the system. In addition, call transfer (e.g., from one MCU to another) requires that the connection from the switch to the new endpoint be established and the path to the transferring endpoint be torn down, thus limiting its use in a large-scale audio conferencing system.

Another conventional method to route calls for an audio conference is to interface with the network signaling layer (SS7/C7) directly.

Packet-switched call routing, on the other hand, facilitates dynamic call routing and call transfer during a call. That is, no dedicated point-to-point connection is required in a packet-switched network. Each packet, including the call data and associated-control, is sent individually to a destination address and the physical route taken from one endpoint to another can vary from packet to packet, eliminating the need for a dedicated circuit for each call. Thus, a call can be routed or even transferred within the packet-switched network simply by renegotiating the end point address. A need exists to provide audio conferencing using packet-switched call routing.

There is a need for audio conferencing implemented on a purely packet-switched network that provides both scalability and fault tolerance. Specifically, a need exists to monitor a pool of MCUs to determine which MCU can best handle the conference, and to dynamically route calls within the purely packet-switched network so that a conference participant in one conference call can be transferred to another conference call and further, entire conferences can be transferred to other MCUs in the MCU pool without interrupting the audio conference (i.e., without tearing down connections and reestablishing the connections within the packet-based network). A need also exists for audio conferencing for both receive-only or passive broadcast participants. Specifically, a need exists to provide a voice stream to the endpoints connected to the conference but that do not actively participate in the conference itself (i.e., do not contribute to the conference voice stream). Yet another need exists for full service audio conferencing using both high-touch (operator assisted) or reservation based audio conferencing and-automated or "ad hoc" audio conferencing using the same platform. Specifically, a need exists to provide conferencing on a reservation basis and on an impromptu basis by monitoring a pool of MCUs to efficiently establish conferences in the packet-based network.

SUMMARY OF THE INVENTION

Solution to the Problem

None of the prior art references discussed above disclose large-scale, fault-tolerant audio conferencing implemented in a purely packet-switched network.

This invention provides an audio conferencing method implemented on a purely packet-switched network that provides scalability and fault tolerance.

A primary object of the present invention is to provide large-scale, fault tolerant audio conferencing using dynamically routed, call transfer in a purely packet-switched network. That is, the present invention monitors a pool of MCUs so that conferences can be efficiently established and routed to different MCUs when an MCU approaches capacity or when an MCU has to be taken out of service. As the audio conferencing method is implemented in a purely packet-switched network, the destination of each audio packet can be rerouted seamlessly without interrupting the audio conference.

Another object of the present invention is to provide an audio conferencing method for receive-only or passive participants. That is, participants that do not actively contribute to the conference can be accommodated (i.e., receive the conference output or voice stream).

Yet another object of the present invention is to provide full service audio conferencing using both high-touch or reservation-based audio conferencing and automated or "ad hoc" audio conferencing on the same platform. That is, a conference need not be reserved against a dedicated MCU and instead, the method of the present invention allows a pool of MCUs to be monitored, thus allowing for both advance conference reservations and ad-hoc conferences.

Summary

The present invention discloses a method of large-scale fault-tolerant audio conferencing in an audio conferencing system using a purely packet-switched network. According to the method of the present invention, an endpoint places a call to a conference gatekeeper indicating an audio conference (i.e., containing a location-request or LRQ signal). The conference gatekeeper determines whether the call contains sufficient information to establish the audio conference. If there is insufficient information, the endpoint is connected to an interactive voice response (IVR) server that obtains sufficient information (i.e., an account number) from the endpoint. Either way, a conference allocation and control system (CACS) linked to the conference gatekeeper selects an available multipoint control unit (MCU) to either host the audio conference if the audio conference has not been established yet, or the MCU that is already hosting the audio conference. The CACS then responds to the endpoint with routing instructions (i.e., a location-found or LCF signal) indicating the selected MCU. The endpoint then uses the routing instructions to connect to the selected MCU, or where the endpoint was initially connected to the IVR server to gather additional information, the endpoint is transferred from the IVR server to the selected MCU. Once connected, the MCU mixes input from all of the endpoints in the audio conference and forms a voice stream, which the MCU then returns to each endpoint in the audio conference.

Once an audio conference is established according to the method of the present invention, the audio conference participants (i.e., endpoints connected to the MCU in the audio conference) can dial-out from the MCU to bring additional participants (i.e., another endpoint) into the audio conference. In addition, the established audio conference supports full service audio conferencing (i.e., both reservation-based, and ad hoc). Furthermore, the established audio conference supports dynamic routing which permits an operator to service multiple MCUs, for the MCUs to be geographically dispersed, and for an audio conference participant and/or an entire audio conference to be moved between MCUs. The audio conference can also be broadcast from a streaming protocol server to passive participants. As such, the audio conference established according to the method of the present invention using a purely packet-switched network can be both large scale, and is fault-tolerant.

These and other advantages, features, and objects of the present invention will be more readily understood in view of the following detailed description and the drawings.

DETAILED DESCRIPTION OF THE INVENTION

Overview

Figure 1:
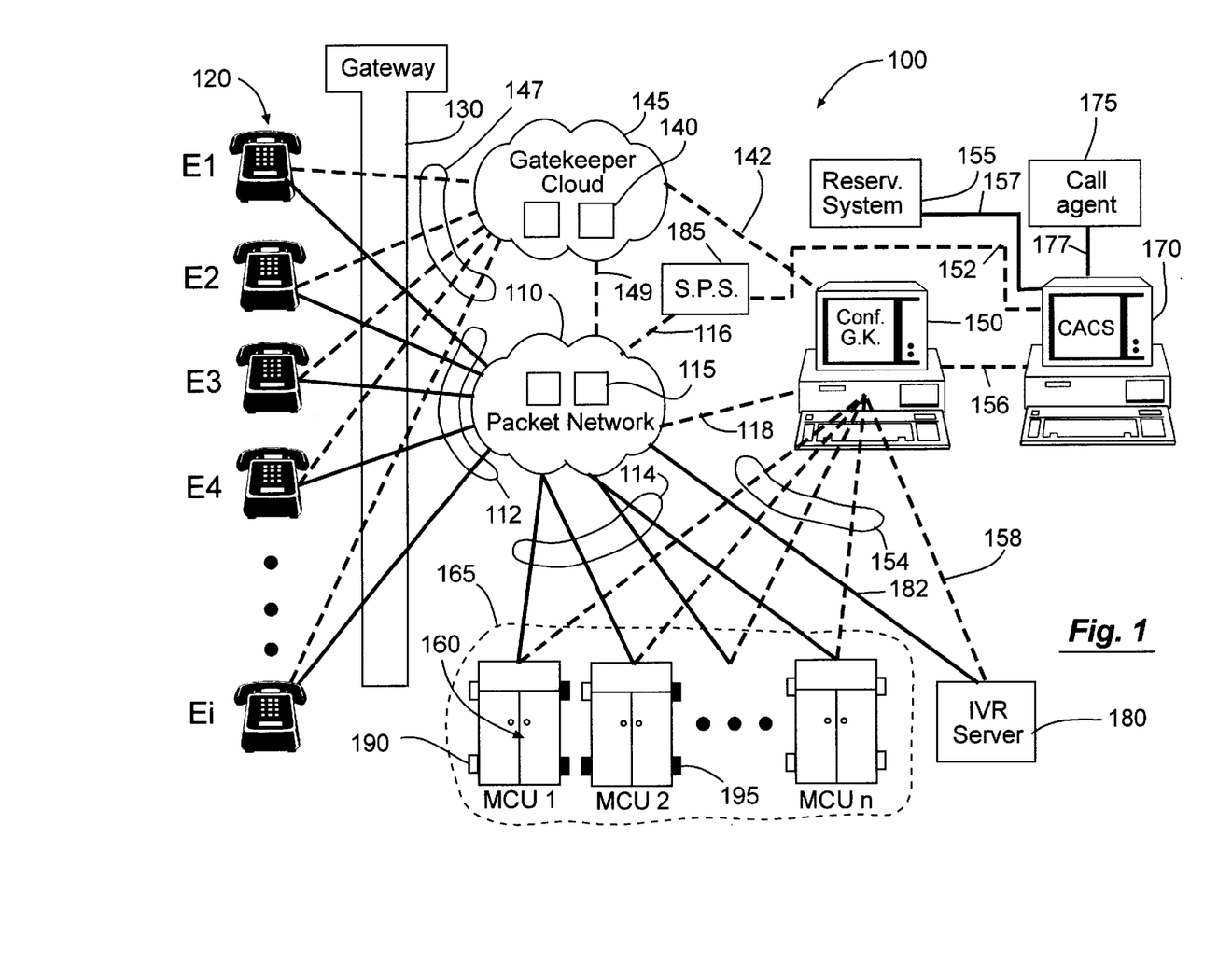
FIG. 1 is a high-level diagram of a packet-switched network for use with the method of the present invention.

FIG. 1 shows a high-level diagram of a purely packet-switched audio conferencing system 100 using a packet network 110 (e.g., Internet Protocol or IP, ATM, Frame Relay or any other packet-switched protocol) in which the method of the present invention can be implemented. The hardware is conventionally linked through packetized signals, as shown in FIG. 1. For purposes of illustration, control or routing signals are shown by dashed lines and audio (or voice stream) signals are shown by solid lines. An endpoint 120 (E1, E2, . . . Ei) accesses 112 the conventional packet network 110 via a gateway 130 and is conventionally linked therein through a series of routers/hubs 115 to a conference gatekeeper 150 (e.g., via 118).

Optionally, each endpoint 120 is also registered with a gatekeeper 140 through which routing signals are sent and received such as over links 147. Registration is conventionally used under the H.323 protocol, however, registration is not required for the audio conferencing method of the present invention. The endpoint 120 can be connected to the same gatekeeper 140 or different gatekeepers within a gatekeeper cloud 145 having one or more gatekeepers 140.

The gatekeeper 140 is then linked 142 to the conference gatekeeper 150. The conference gatekeeper 150 controls an MCU pool 165 having one or more conferencing MCUs 160 (MCU 1, MCU 2, . . . MCU n). The conference gatekeeper 150 is also linked 156 to a conference allocation and control system (CACS) 170. Optionally, the conference gatekeeper 150 is also linked 158 to a conventionally available interactive voice response (IVR) server 180 that is capable of gathering additional routing information from the endpoint 120 via links 182,112

In one embodiment, the conference system 100 of the present invention also includes a conventional streaming protocol server 185 (e.g., a real-time standard broadcast server or RTSP) linked 152 to the CACS 170 and the packet network 110, a reservation system 155 linked 157 to the CACS 170, and a call agent 175 linked 177 to the conference gatekeeper. The streaming protocol server 185 is conventionally available and uses the conference sum (i.e., the mixed voice stream from all endpoints 120 actively participating in the audio conference) as input for a broadcast signal to passive participants (i.e., endpoints 120 not actively participating in the audio conference). The reservation system 155 is also conventionally available and used to reserve planned audio conferences against an available MCU 160 (i.e., an MCU having available ports 190). Likewise, the call agent 175 is conventionally available and manages available ports 190 in the MCU pool 165 and assigns calls on an "ad hoc" basis to available MCUs 160.

The endpoint 120 is a conventionally available client terminal that provides real-time, two-way communications using packetized audio signals. Packetized audio signals contain digitized and compressed speech or touch tones. Any protocol can be used under the teachings of the present invention and the specific protocol will be based on design considerations. That is, different ITU recommendations for digitizing and compressing signals reflect different tradeoffs between speech quality, bit rate, computer power, and signal delay (e.g., G.711, G.723, etc.). It is to be expressly understood that the endpoint 120 can be either packet-based or circuit-switched, as the gateway 130 hides the physical transport to the endpoint 120.

The gateway 130 is optional under the teachings of the present invention, and when used can be a part of the packet network 110 itself. The purpose of the gateway 130 is to provide, among other things, a translation function between conventional transmission formats (e.g., H.323, H.225.0, H.221, etc.). It is to be expressly understood that the gateway 130 can support endpoints 120 that comply with other protocols and the gateway 130 need only be equipped with the appropriate transcoders. However, the gateway 130 is not required where connections to other networks are not needed, and the endpoint 120 then communicates directly with another endpoint 120 on the same network and a single translation function is used.

Gatekeepers 140 (and hence the gatekeeper cloud 145) are also optional. Where the gatekeepers 140 are used under the teachings of the present invention, the purpose of gatekeepers 140 is to perform two call control functions. Specifically, the gatekeeper 140 performs address translation and manages bandwidth. Address translation is done conventionally (e.g., domain name to IP address or touch tones to IP address) within the packet network 110 itself. Bandwidth is also conventionally managed within the packet network 110 itself (e.g., as IP trunks reach capacity, the network moves audio, data, etc. signals to other lower volume IP trunks). When the gatekeeper 140 is not used, endpoints are connected through the gateway 130 (i.e., for H.323) or directly through the packet network 110.

The conference gatekeeper 150 in conjunction with the CACS 170 controls the creation and execution of audio conferences. The CACS 170 determines an available MCU 160 (i.e., having sufficient available ports 190) to host the audio conference and provides routing instructions to the conference gatekeeper 150 to direct the call from the endpoint 120 to the appropriate MCU 160. For instance, if a network administrator has specified a threshold (i.e., in the CACS) for the number of simultaneous audio conferences (i.e., number of active conferences, number of available ports, etc.), the CACS 170 can refuse to make any more connections once the specified threshold is reached. In addition, the CACS 170 also provides information concerning the audio conference parameters to the MCU 160 and collects billing information.

The MCU 160 supports audio conferences between three or more endpoints 120. The MCU 160 is conventionally available and consists of a multipoint controller (not shown) and optionally one or more multipoint processors (not shown). For purposes of illustration, and not intended to limit the scope of the present invention, four ports 190, 195 are shown on each MCU 160, although a typical MCU 160 can handle approximately 1,500 active conference participants. Available ports 190 are shown "open" while unavailable ports 195 are shown "closed". The MCU 160 handles negotiations between all endpoints 120 to determine common capabilities for audio processing. The MCU 160 also controls audio conference resources by determining which, if any of the audio streams will be multicast.

With respect to the audio conferencing system 100 shown in FIG. 1, an audio conference is initiated when a call identifying a particular audio conference is placed by an endpoint 120, as explained in more detail below. Routing signals are transmitted 112 or 147 either through the packet network 110 (i.e., if the gatekeeper 140 is not used) or through the gatekeeper 140, respectively, to the conference gatekeeper 150. An MCU 160 is selected by the conference gatekeeper 150 and the CACS 170 and the audio conference is established by connecting the endpoint 120 through the packet network 110 over links 112, 114 to the MCUI 160. Additional endpoints 120 can place a call identifying the audio conference and are similarly connected via links 112, 114 to the identified audio conference over link 112 through the packet network 110 to the MCU 160 by the conference gatekeeper 150 and the CACS 170, as described in more detail below.

It is to be expressly understood that each of the hardware components of the purely packet-switched conferencing system 100 described above are conventionally available, and it is the arrangement and/or configuration of each component in the manner described above, and the method of using each component in this configuration as explained below that is new. Likewise, communication using packetized signals and various protocols is conventionally known. It is the combination of each of the above-identified hardware components to form the conferencing system 100 for use with the method of the present invention that is new. It is also to be expressly understood that alternative hardware configurations are possible under the teachings of the present invention and that the method of the present invention is not to be limited by the configuration shown in FIG. 1 nor by any particular network protocol.

Establishing a Conference

Figure 2:
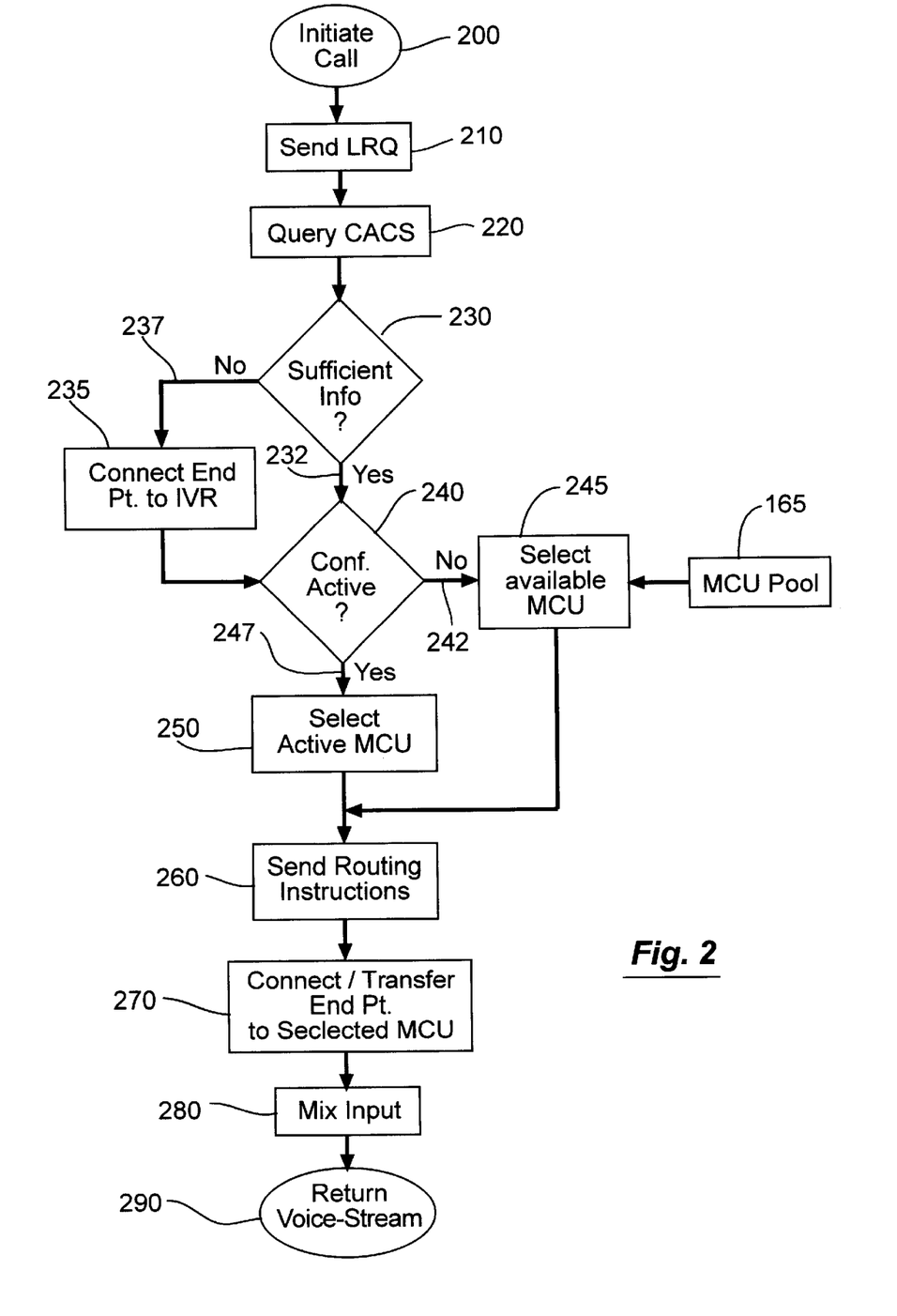
FIG. 2 is a flow chart illustrating an audio conferencing method of the present invention.

An embodiment of the audio conferencing method of the present invention is illustrated in FIG. 2 and explained with reference to FIG. 1. At step 200, an endpoint 120 initiates a call to the audio conferencing system 100, for example, by entering a destination, account number, URL, or IP address. Optionally the call is routed 147 through the gateway 130 to an address serviced by the gatekeeper 140 in the gatekeeper cloud 145. If the gatekeeper 140 is not used, the call is then routed 112 directly to the packet network 110. Either way, the call is routed to the conference gatekeeper 150 in step 210. The initiating call contains conventional packetized control signals for routing the call including any audio conference identification information required to initiate the audio conference (i.e., a conventional location request or LRQ). For example, see co-owned U.S. patent applications Ser. No. 09/366,355 and Ser. No. 08/825,477 (hereinafter, the on-demand teleconferencing methods), incorporated herein by reference. The LRQ is received via 147, 142 (or 112, 118 when the gatekeeper 140 is not used) by the conference gatekeeper 150 which in turn queries 156 the CACS 170 for audio conference routing instructions in step 220. The CACS 170 determines whether the call (i.e., the LRQ) contains sufficient information to set up and route the audio conference in step 230. If the call contains sufficient information 232 (i.e., enough information to uniquely identify a subscriber, such as a subscriber identification, pass code, etc.), the CACS 170 determines whether the indicated audio conference is active (i.e., whether other endpoints 120 are currently connected to the indicated audio conference) in step 240. That is, the CACS 170 starts all conferences with the MCU 160 and thus stores all activity in memory. If a CACS 170 is disconnected from an MCU 160, a conventional process is used to resync the CACS 170 and the MCU 160, and thus the CACS 170 is continuously updated with respect to activity in the MCU pool 165. If the CACS 170 determines that the indicated audio conference is not active 242, the CACS 170 selects an available MCU 160 from the MCU pool 165 to host the audio conference in step 245. In step 260, the CACS 170 then returns (e.g., via 156) routing information to the conference gatekeeper 150 and the conference gatekeeper 150 responds 142, 147 (or 118, 112 when gatekeeper cloud 145 is not used) to the endpoint 120 with a conventional location found signal (LCF) indicating the selected MCU 160 to host the audio conference. The endpoint 120 then establishes 112, 114 a point-to-point call via the packet network 110 with the selected MCU 160 in step 270, and an audio conference is established with one participant (i.e., the initiating endpoint). In step 280, the MCU 160 mixes the input from all endpoints 120 participating in the audio conference, and the MCU 160 returns (e.g., via 114, 112) a voice stream to the endpoint 120 in step 290. The term "voice stream" as used herein, means the mixed sum of input from all actively participating endpoints in the conference. Further, the voice stream returned to an actively participating endpoint does not include input from the same endpoint 120.

Additional endpoints 120 can join an active audio conference in a manner similar to that outlined above. That is, an additional endpoint 120 initiates over link 147 (or 112 when gatekeeper cloud 145 is not used) a call to an address identifying the audio conference in step 200. A conventional LRQ is sent 147, 142 (or 112, 118 when the gatekeeper cloud 145 is not used) to the conference gatekeeper 150 as discussed above. The conference gatekeeper 150 queries 156 the CACS 170 for routing instructions in step 220. If there is sufficient information to set up and route the audio conference in step 230, the CACS 170 proceeds to determine whether the audio conference is active in step 240, selects the active MCU 160 in step 250 if the audio conference is active 247, and responds 156 with appropriate routing instructions to the conference gatekeeper 150 in step 260.

The conference gatekeeper 150 responds 142, 147 (or 118, 112 where the gatekeeper 140 is not used) to the endpoint 120 with a conventional LCF signal indicating the selected MCU 160 hosting the active audio conference and the endpoint 120 establishes a point-to-point call via links 112, 114 with the selected MCU 160 in step 270, as discussed above. The MCU 160 mixes the input from each endpoint 120 participating in the audio conference in step 280 and returns an appropriate voice stream over links 114, 112 to each endpoint 120 in step 290. Additional endpoints can continue to join the audio conference in a similar manner to that just described.

Figure 3:
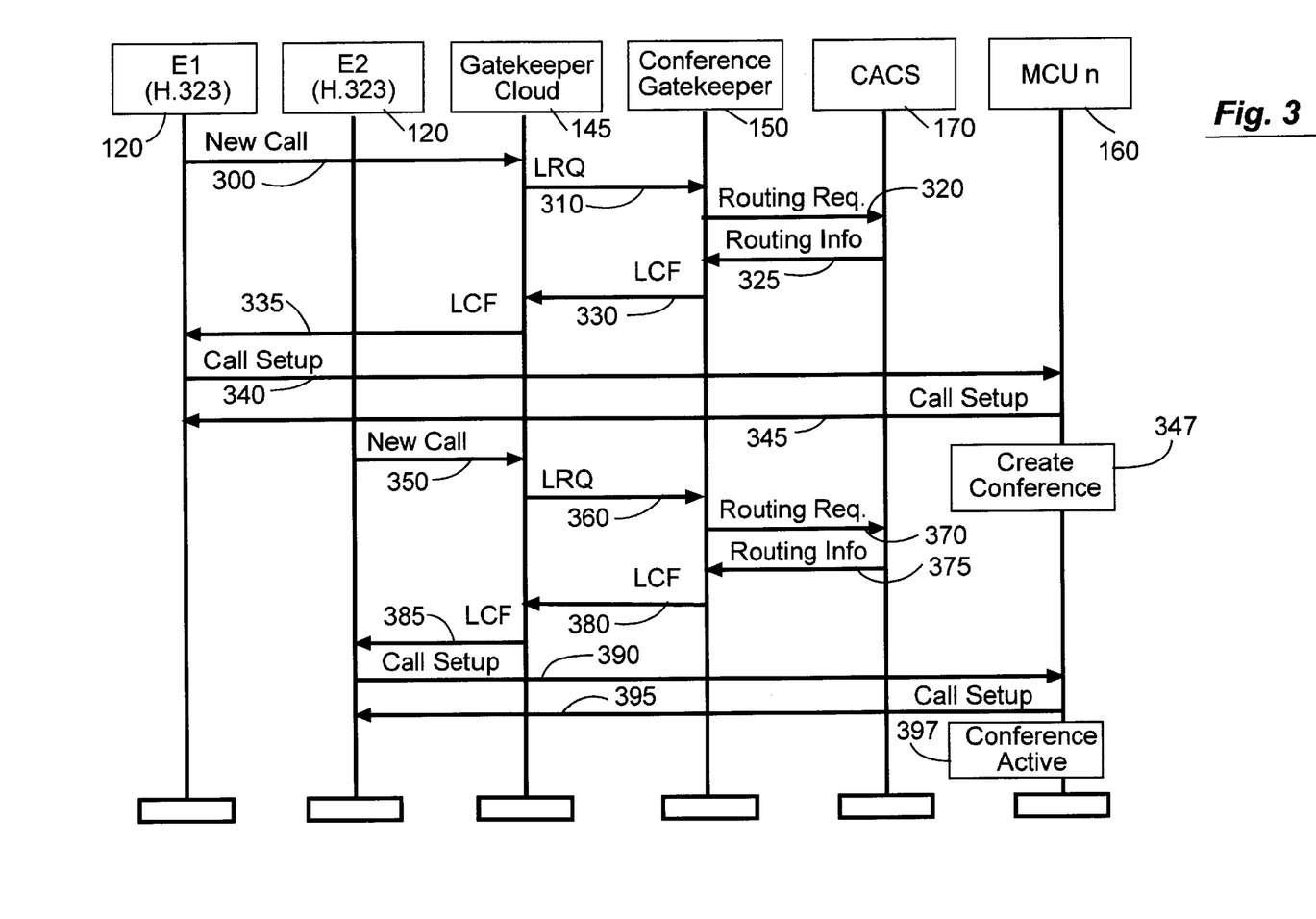
FIG. 3 shows an example of the audio conferencing method of FIG. 2 in which an IVR server is not used.

An example of the audio conferencing method of the present invention in which there is sufficient information associated with the call (i.e., an IVR server 180 is not required to gather additional information such as an account number) is shown in FIG. 3. A new call identifying the audio conference (e.g., containing a URL, conference access number, etc.) is placed 300 from the endpoint 120 (e.g., E1, in this example and H.323 compliant endpoint) via link 147 to a gatekeeper 140 in the gatekeeper cloud 145 (step 200). An LRQ is transmitted 310 from the gatekeeper cloud 145 to the conference gatekeeper 150 via 142 (step 210), which in turn requests 320 routing instructions (i.e., the details for the LCF) from the CACS 170 via 156 (step 220). The CACS 170 selects an available MCU 160 from the MCU pool 165 (steps 230, 240, 245) and returns 325 routing instructions to the conference gatekeeper 150 via link 156, which in turn forwards 330 an LCF signal through the gatekeeper cloud 145 and back 335 to the endpoint 120 (E1) via links 142, 147 (steps 270, 280, and 290). The endpoint 120 (E1) uses the LCF to setup 340, 345 a point-to-point connection with the MCU 160 identified by the LCF signal and establish 347 the requested audio conference (i.e., an audio conference having only the initiating endpoint E1) via links 112, 114. For example, see the on-demand teleconferencing methods, incorporated herein by reference. Additional endpoints 120 (i.e., E2) join the established audio conference 347 as follows. A new call identifying the established audio conference 347 is placed 350 to the gatekeeper cloud 150 via link 147 (step 200). An LRQ is transmitted 360 from the gatekeeper cloud 145 to the conference gatekeeper 150 via link 142 (step 210), which in turn requests 370 routing instructions to the established audio conference from the CACS 170 via link 156 (step 220). The CACS 170 selects the active MCU 160 identified as hosting the requested audio conference (steps 230, 240, and 250) and returns 375 routing instructions identifying the MCU 160 hosting the audio conference 347 to the conference gatekeeper 150 via link 156, which in turn forwards 380, 385 an LCF signal through the gatekeeper cloud 145 to the endpoint 120 (E2) via links 142, 147 (step 260). The endpoint 120 (E2) uses the routing information from the LCF to establish a connection 390, 395 to the appropriate MCU 160 (via 112, 114), and an active audio conference 397 is established (i.e., between E1 and E2) (steps 270, 280, and 290). Additional endpoints 120 (E3, E4, . . . Ei) can participate in the active audio conference 397 by accessing the appropriate MCU 160 as just described with respect to the endpoint 120 (E2) or through a dial out request, as described below. It is to be expressly understood that the above example is presented to be illustrative of the audio conferencing method of the present invention, and in no way should be interpreted to limit the scope of the present invention.

In another embodiment, also shown in FIG. 2, where the call does not contain sufficient information 237 (i.e., additional information such as an account number is required), the endpoint 120 must first connect (via links 112, 182) to an IVR server 180 capable of gathering the required information in step 235 (e.g., by querying the endpoint 120 for an account number). Routing proceeds as described above with respect to steps 240 through 260 and in step 270, the endpoint 120 is then transferred from the IVR server 180 to the MCU 160 selected in step 245 or 250 before mixing the input and returning a voice stream in steps 280 and 290, respectively. Thus, there is no requirement to collocate the device gathering the information and the MCU 160 which will be the final destination.

Figure 4:
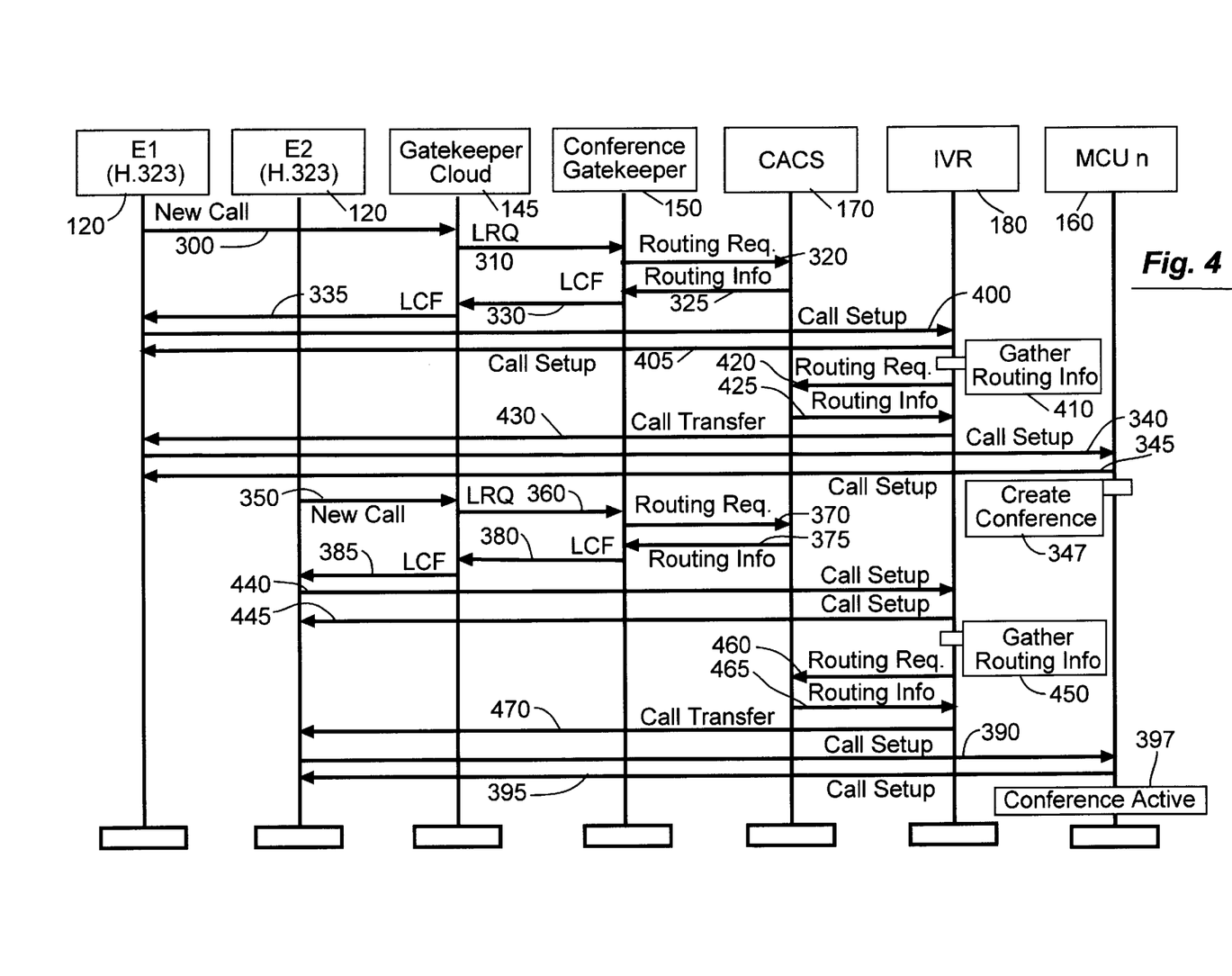
FIG. 4 shows an example of the audio conferencing method of FIG. 2 in which an IVR server is used.

An example of the audio conferencing method of the present invention in which an IVR server 180 is used is shown in FIG. 4. Steps 300, 310 and 320 in FIG. 4 correspond to those shown in FIG. 3. However, in FIG. 4, the CACS determines that the routing request contains insufficient information to establish an audio conference. Hence, a signal is returned 325, 330, and 335 via links 118, 112 to the endpoint 120 (E1) to route the endpoint 120 (E1) to an IVR server 180. The endpoint 120 (E1) establishes a connection with the IVR server 180 (400 and 405), and the IVR server 180 gathers 410 additional information (e.g., an account number) from the endpoint 120 (E1) to establish an audio conference (step 235). Once the IVR server 180 has gathered this information, the IVR server 180 sends 420 a routing request to the CACS 170 via links 158, 156, which in turn returns 425 routing information to the IVR server 180 (steps 240, 245, and 260). Based on the routing information, the call is then transferred 430 from the IVR server 180 and a point-to-point connection is established 340, 345 between the endpoint 120 (E1) and the MCU 160 and an audio conference 347 is established via links 112, 114 (steps 270, 280, and 290). Additional endpoints 120 (e.g., E2) join the audio conference again by placing 350 a call through 360 the gatekeeper cloud 145 to the conference gatekeeper 150 (step 200). Again, the conference gatekeeper 150 requests 370 routing information from the CACS 170 and is provided 375 with routing information to an IVR server for obtaining additional information from the endpoint 120 (E2) (steps 210, 220, 230, 237). The LCF is transmitted 380, 385 to the endpoint 120 (E2) and a call is established 440, 445 between the endpoint 120 (E2) and the IVR server 180. The IVR server 180 gathers 450 the additional information (i.e., an account number, access code, etc.) from the endpoint 120 (E2) and transmits 460 a routing request to the CACS 170 (step 235). The CACS 170 responds 465 with routing information identifying the MCU 160 hosting the audio conference, and the call is then transferred from the IVR server 180 to the identified MCU 160, a point-to-point connection 470 is established between the endpoint 120 (E2) (steps 240 to 290 discussed above). It is to be expressly understood that the above example is presented to be illustrative of the audio conferencing method of the present invention, and in no way should be interpreted to limit the scope of the present invention.

Communication with the gateway 130 and the gatekeeper 140, and address resolution is conventional. Furthermore, it is to be expressly understood that the use of the gateway 130 and the gatekeeper 140 is optional and need not be used under the teachings of the present invention. In an embodiment where the gateway 130 and the gatekeeper 140 are not used, the call is routed directly through the packet network 110 (e.g., between routers/hubs 115).

Dial-out Method

Figure 5:
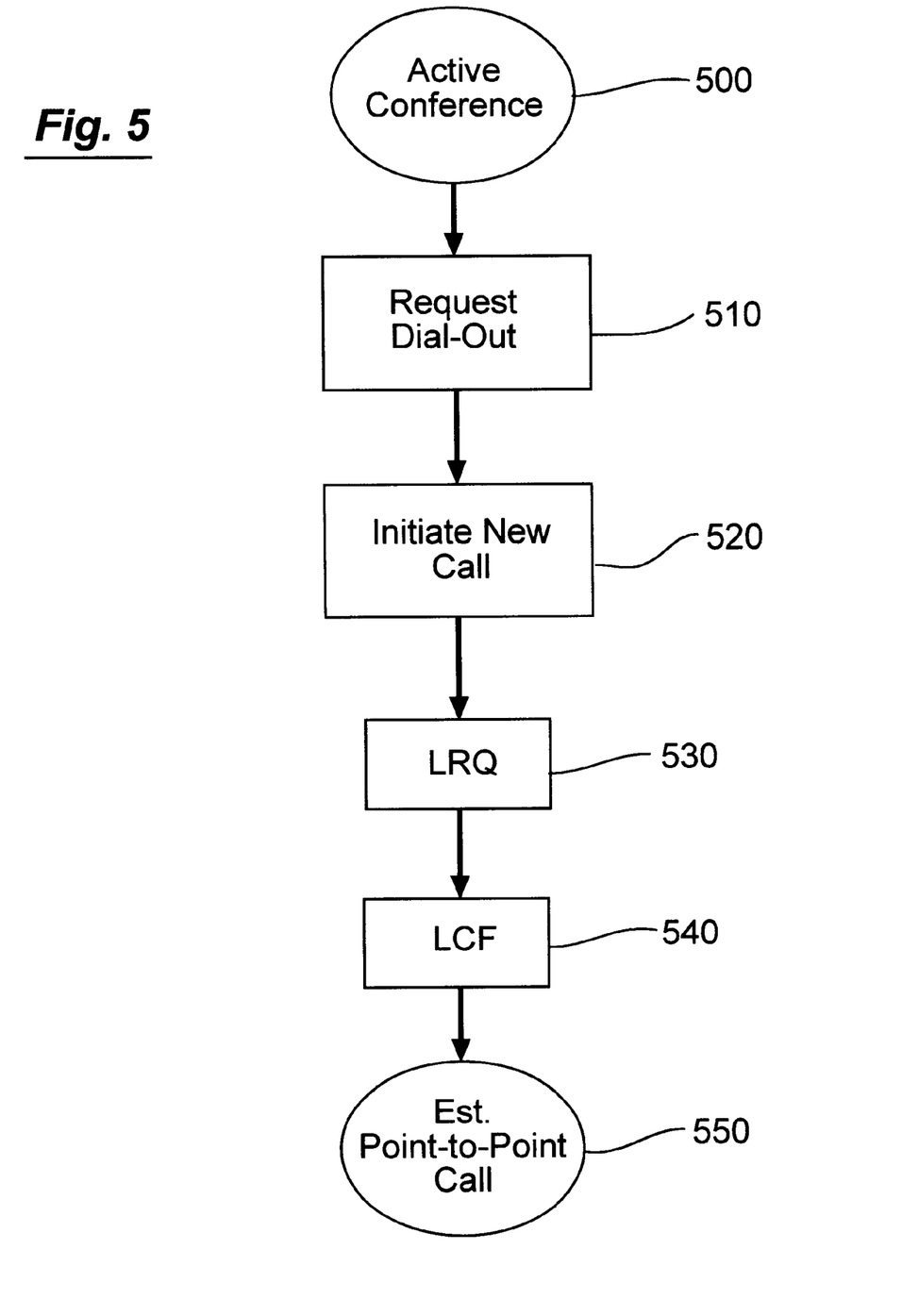
FIG. 5 is a flow chart illustrating a dial-out method of the present invention.

An embodiment of the dial-out method of the present invention is illustrated in FIG. 5. The dial-out method is used to connect to an endpoint 120 not currently connected to an active audio conference. For example, the dial-out method can be used when an active audio conference exists 500 between conference participants (e.g., E1, E2, and E3) and the conference participants wish to bring in an additional participant (e.g., E4).

In step 510, a conference participant conventionally initiates the dial-out from an originating endpoint 120 (e.g., E1, via touch tone or a web interface) and the CACS 170 requests a dial-out from the MCU 160 and supplies the MCU 160 with the address of the endpoint 120 to connect to (e.g., E4). The MCU 160 initiates (via 154) a new call request to the conference gatekeeper 150 in step 520. In step 530, the gatekeeper 140 (or packet network 110 when cloud 145 is not used) receives an LRQ from the conference gatekeeper 150 and in step 540 the gatekeeper 140 (or packet network 110) returns the destination address (i.e., via an LCF message) which is forwarded 154 to the MCU 160 from the conference gatekeeper 150. The MCU 160 then establishes a point-to-point call to the endpoint 120 (E4) and mixes the input to form a voice stream for all conference participants (E1–E4) in step 550, similar to that described above with respect to the audio conferencing method. Thus, the additional participant (E4) is brought into the active audio conference. If the additional participant (E4) does not answer the dial-out request, the line is disconnected by the originating endpoint 120 (E1) and the originating endpoint 120 (E1) is placed back in the audio conference.

Figure 6:
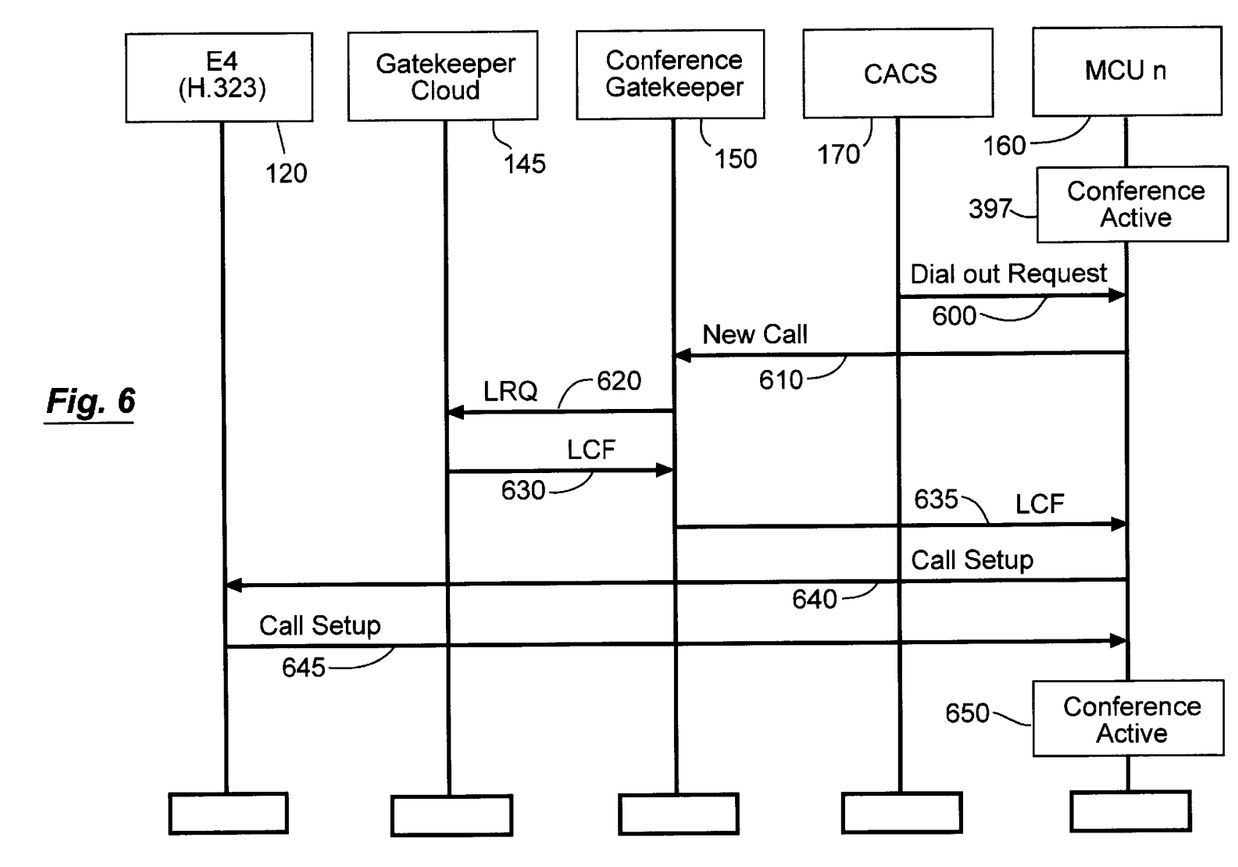
FIG. 6 shows an example of the dial-out method of FIG. 5.

An example of the dial-out method of the present invention is shown in FIG. 6. In this example, an active audio conference 397 has already been established (e.g., according to the method of establishing an audio conference discussed above), and the existing participants (e.g., E1–E3) wish to bring in an additional endpoint 120 (E4) to participate in the active audio conference 397 (step 500). An initiating endpoint (i.e., E1) places a call identifying the additional endpoint (E4) and the CACS 170 requests 600 a dial-out from the MCU 160 (step 510). The MCU 160 transmits 610 the new call to the conference gatekeeper 150 via link 154 (step 520), which in turn requests 620 the location of the desired endpoint 120 (E4) from the gatekeeper cloud (via 142). The gatekeeper cloud 145 responds 630 via link 142 (step 530) to the conference gatekeeper 150 with an LCF signal which is in turn transmitted 635 to the MCU 160 via link 154 (step 540). The MCU 160 then uses the information from the LCF to establish 640, 645 a point-to-point call between the MCU 160 and the endpoint 120 (E4) via links 114, 112. Hence, the endpoint 120 (E4) is brought into the active audio conference 650 as an additional participant (step 550). It is to be expressly understood that the above example is presented to be illustrative of the audio conferencing method of the present invention, and in no way should be interpreted to limit the scope of the present invention.

Full Service Audio Conferencing

Planned audio conferencing conventionally requires an advance reservation against a specific MCU 160 or MCU pool 165 and operator assistance (i.e., high-touch) to facilitate the audio conference. Ad-hoc audio conferencing conventionally is able to support an audio conference without a reservation and without operator assistance by creating a conference against a single MCU 160. On the other hand, once an audio conference is established according to the method of the present invention, the audio conferencing system 100 offers full service audio conferencing that supports both planned and ad-hoc audio conferencing.

The method of the present invention implements full service audio conferencing by integrating the reservation system 155 of the planned audio conferencing system and the call agent 175 of the ad-hoc system. Ports 190, 195 utilized for each audio conferencing type can be dynamically driven by current loads to achieve maximum port utilization.

In one embodiment, the reservation system 155 and the call agent 175 are loosely integrated. That is, the master reservation system 155 conventionally used to reserve planned audio conferences on specific MCUs 160 in pool 165 keeps the ad-hoc call agent 175 informed as to the number of available ports 190 on each MCU 160 and the ad hoc call agent 175 conventionally manages the available ports 190. The number of available ports 190 on a given MCU 160 are conventionally monitored to ensure that all reservations can be serviced. For example, an available port 190 that will be required to support a reservation in the next five minutes is not considered available (i.e., 195). Likewise, statistically expected ad-hoc usage is also monitored and accounted for.

In another embodiment, the reservation system 155 and the call agent 175 are tightly integrated. That is, the reservation system 155 is used to reserve planned audio conferences against MCU pool 165 but the reservation is not bound to a specific MCU 160. Instead, the audio conference is assigned to an MCU 160 by the call agent 175 when it is created and the call agent 175 continuously monitors the port 190, 195 usage and anticipated near term usage (i.e., reserved ports) of each MCU 160 in the pool 165 to determine the number and location of available ports 190. When an audio conference needs to be created (either a planned audio conference or an ad-hoc audio conference), the call agent 175 selects an appropriate MCU 160 to host the audio conference and ensures that all calls for a given audio conference are routed to the appropriate MCU 160. Thus, the call agent 175 determines the location of all audio conferences allowing for greater port 190, 195 utilization as well as better fault tolerance (i.e., audio conference requests will seldom be denied because available ports 190 are closely monitored).

Network Centric Call Transfer and Dynamic Call Routing

Once an audio conference is established according to the method of the present invention, the packet-switched audio conference system 100 also facilitates dynamic call routing. A point-to-point connection is made using logical links (i.e., within the packet network 110) and a dedicated physical connection is not required (i.e., as in a GSTN). That is, the call data and associated control are sent via packets through the packet network 110 and each packet is sent individually to a destination address so that the physical route taken from end-to-end may vary from packet to packet (i.e., a call can be routed or transferred by simply renegotiating the destination address).

Thus, under the teachings of the present invention, calls can be routed to any MCU 160 within the MCU pool 165 allowing MCUs 160 to be geographically distributed and the audio conference network 100 to be large-scale. In addition, the ability to transfer a call from one MCU 160 to another allows the operator voice path to be routed to any MCU 160 in the conference system 100. This in turn allows an operator to service a large number of MCUs 160 and to quickly switch which MCU 160 their voice path terminates on.

In addition, an audio conference established according to the method of the present invention allows an audio conference participant to be moved from one audio conference to another, even where the audio conferences are on separate MCUs 160. The destination address of the packets are simply renegotiated to another MCU 160 instead of establishing a connection between the two MCUs 160.

An audio conference established according to the method of the present invention also allows a new audio conference to be created on a different MCU 160 where an MCU 160 is taken out of service or otherwise unavailable to take additional participants (e.g., due to overflow, etc.). By transferring calls, the audio conference can be serviced by any MCU 160 in the system 100. All calls destined for a "moved" audio conference are still statically routed to the original MCU 160, but immediately transferred to the correct MCU 160, thus service to the audio conference is not interrupted.

Receive Only Support

Audio conference participants can be either active or passive. Participants that can both contribute to and receive audio input from an audio conference are active participants. Those that can only receive a voice stream from an audio conference are passive participants. Once an audio conference is established according to the method of the present invention, the audio conference supports both active and passive participants.

Support for passive participants can still be provided where there are only a limited number of participants by the MCU 160 the same as it is in a conventional circuit-switched network. That is, a full duplex connection can be established and the receive path simply ignored. However, the method of the present invention can also use broadcasting to support passive participants. That is, the audio conference output is directed to a streaming protocol server 185 (e.g., a real-time standard broadcast server RTSP). The streaming protocol server 185 uses the audio conference sum as its input, and passive participants can connect to the streaming protocol server 185 using conventional standards of service. As such, a large number of broadcast protocols can be supported, and a virtually unlimited number of passive participants can be supported with little or no impact on the conferencing MCU 160.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described herein and above is further intended to explain the best mode presently known of practicing the invention and to enable others skilled in the art to utilize the invention as such, or in other embodiments, and with the various modifications required by their particular application or uses of the invention. It is intended that the appended claims be construed to include alternate embodiments to the extent permitted by the prior art.

We claim:

1. A method of large-scale fault-tolerant audio conferencing in a purely packet-switched audio conferencing system, said method comprising the steps of:

placing a call from an endpoint to a conference gatekeeper, said call indicating an audio conference;

querying a conference allocation and control system from said conference gatekeeper for routing instructions for said audio conference;

determining in said conference allocation and control system whether said audio conference is active;

selecting in said conference allocation and control system a multiple control unit to host said audio conference when said audio conference is inactive;

selecting in said conference allocation and control system a multiple control unit hosting said audio conference when said audio conference is active;

responding from said conference allocation and control system to said endpoint with said queried routing instructions, said queried routing instructions indicating said selected multiple control unit;

connecting said endpoint to said selected multiple control unit;

mixing input from all endpoints in said audio conference to form a voice stream;

returning said voice stream to each endpoint in said audio conference;

determining in said conference allocation and control system whether the call from said endpoint contains adequate information to establish said audio conference;

responding from said conference allocation and control system to said endpoint with routing instructions to an interactive voice response server when there is other than said adequate information to establish said audio conference;

connecting said endpoint to said interactive voice response server when there is inadequate information to route said call;

gathering in said interactive voice response server, after connecting said endpoint to said interactive voice response server, adequate information to establish said audio conference; and transferring said endpoint from said interactive voice response server to said selected multiple control unit after said interactive voice response server gathers said adequate information.

2. A method of large-scale fault-tolerant audio conferencing in a purely packet-switched audio conferencing system, said method comprising the steps of:

placing a call from an endpoint to a conference gatekeeper, said call indicating an audio conference;

querying a conference allocation and control system from said conference gatekeeper for routing instructions for said audio conference;

determining in said conference allocation and control system whether said audio conference is active;

selecting in said conference allocation and control system a multiple control unit to host said audio conference when said audio conference is inactive;

selecting in said conference allocation and control system a multiple control unit hosting said audio conference when said audio conference is active;

responding from said conference allocation and control system to said endpoint with said queried routing instructions, said queried routing instructions indicating said selected multiple control unit;

connecting said endpoint to said selected multiple control unit;

mixing input from all endpoints in said audio conference to form a voice stream;

returning said voice stream to each endpoint in said audio conference;

further having a dial-out method comprising the steps of:
    initiating a call request from said selected multiple control unit to said conference gatekeeper, said call request indicating an additional endpoint;
    transmitting an location request from the conference gatekeeper to a gatekeeper cloud;
    returning a destination address to said conference gatekeeper from said gatekeeper cloud, said destination address corresponding to said additional endpoint;
    forwarding said destination address from said conference gatekeeper to said selected multiple control unit;
    establishing a point-to-point call from said multiple control unit to said additional endpoint based on said destination address, thereby bringing said additional endpoint into said audio conference.

3. The method of claim 2 further supporting full service audio conferencing using a reservation system and a call agent.

4. The method of claim 3 wherein the reservation system and the call agent are tightly integrated.

5. The method of claim 3 wherein the reservation system and the call agent are loosely integrated.

6. The method of claim 2 further including the step of dynamically routing an operator voice path to service multiple multiple control units.

7. The method of claim 2 further including the step of renegotiating the destination address of a voice path to move an audio conference participant from said selected multiple control unit to a second multiple control unit.

8. The method of claim 2 further including the step of moving said audio conference from said selected multiple control unit to a second multiple control unit.

9. The method of claim 2 further including the steps of:
    providing said audio conference to a streaming protocol server from said selected multiple control unit;
    connecting a passive participant to said streaming protocol server; and
    broadcasting said audio conference from said streaming protocol server to a passive participant.

10. The method of claim 2 wherein the step of placing a call links said endpoint to said conference gatekeeper through said a gatekeeper cloud.

11. The method of claim 2 wherein the step of placing a call links said endpoint to said conference gatekeeper through said packet-switched network.

12. The method of claim 2 wherein the routing instructions include at least a location found signal indicating the selected multiple control unit.

13. The method of claim 2 wherein the call includes at least a location request signal.

14. A large-scale fault-tolerant purely packet-switched audio conferencing method, said method comprising the steps of:
    establishing an audio conference by:
        connecting an endpoint to a conference gatekeeper, said endpoint indicating an audio conference;
        querying a conference allocation and control system from said conference gatekeeper for routing instructions for said audio conference;
        determining in said conference allocation and control system the status of said audio conference;
        selecting in said conference allocation and control system a multiple control unit to host said audio conference when said status of said audio conference is inactive;
        selecting in said conference allocation and control system a multiple control unit hosting said audio conference when said status of said audio conference is active;
        responding from said conference allocation and control system to said endpoint with said queried routing instructions, said queried routing instructions indicating said selected multiple control unit;
        connecting said endpoint to said audio conference through said selected multiple control unit;
        mixing input from all endpoints in said audio conference to form a voice stream;
        returning said voice stream to each endpoint in said audio conference; and
    dialing out from the audio conference when said status of said audio conference is active to connect additional endpoints to the audio conference by:
        initiating in the endpoint connected to said audio conference a call request from said selected multiple control unit to said conference gatekeeper, said call request indicating said additional endpoint;
        transmitting an location request from the conference gatekeeper to the gatekeeper cloud;
        returning a destination address to said conference gatekeeper from said gatekeeper cloud, said destination address corresponding to said additional endpoint;
        forwarding said destination address from said conference gatekeeper to said selected multiple control unit;
        establishing a point-to-point call from said multiple control unit to said additional endpoint based on said destination address, thereby bringing said additional endpoint into said audio conference.

15. The method of claim 14 further comprising the steps of:
    determining in said conference allocation and control system whether the call from said endpoint contains adequate information to establish said audio conference;
    responding from said conference allocation and control system to said endpoint with routing instructions to an interactive voice response server when there is other than said adequate information to establish said audio conference;
    connecting said endpoint to said interactive voice response server when there is inadequate information to route said call;
    gathering in said interactive voice response server, after connecting said endpoint to said interactive voice response server, adequate information to establish said audio conference; and
    transferring said endpoint from said interactive voice response server to said selected multiple control unit after said interactive voice response server gathers said adequate information.

16. The method of claim 14 further supporting full service audio conferencing using a reservation system and a call agent.

17. The method of claim 14 wherein said selected multiple control unit is selected from an multiple control unit pool.

18. The method of claim 14 further including the step of dynamically routing an operator voice path to service multiple multiple control units.

19. The method of claim 14 further including the step of renegotiating the destination of a voice path to move an audio conference participant from said selected multiple control unit to a second multiple control unit.

20. The method of claim 14 further including the step of moving said audio conference from said selected multiple control unit to a second multiple control unit.

21. The method of claim 14 further including the steps of:
provide said audio conference to a streaming protocol server from said selected multiple control unit;
connecting a passive participant to said streaming protocol server; and
broadcasting said audio conference from said streaming protocol server to a passive participant.

22. A large-scale fault-tolerant audio conferencing method over a purely packet-switched network, said method comprising the steps of:
initiating a call from an endpoint to a conference gatekeeper;
querying a conference allocation and control system from said conference gatekeeper for routing instructions for an audio conference;
determining in said conference allocation and control system whether the call from said endpoint contains adequate information to establish said audio conference;
responding from said conference allocation and control system to said endpoint with routing instructions to an interactive voice response server when there is other than said adequate information to establish said audio conference;
connecting said endpoint to said interactive voice response server when there is other than said adequate information to route said call and:
  gathering in said interactive voice response server adequate information to establish said audio conference; and
  transferring said adequate information to the conference allocation and control system;
  determining in said conference allocation and control system the status of said audio conference;
  selecting in said conference allocation and control system a multiple control unit to host said audio conference when said status of said audio conference is inactive;
  selecting in said conference allocation and control system a multiple control unit hosting said audio conference when said status of said audio conference is active;
  responding from said conference allocation and control system to said endpoint with said queried routing instructions, said queried routing instructions indicating said selected multiple control unit;
  transferring said endpoint from said interactive voice response server to said audio conference at said selected multiple control unit when there is other than said adequate information to route the call; and
  connecting said endpoint to said audio conference at said multiple control unit when there is adequate information to route the call.

23. The method of claim 22 further supporting full service audio conferencing using a reservation system and a call agent.

24. The method of claim 22 wherein said selected multiple control unit is selected from a multiple control unit pool.

25. The method of claim 22 further including the step of dynamically routing an operator voice path to service multiple multiple control units.

26. The method of claim 22 further including the step of renegotiating the destination of a voice path to move an audio conference participant from said selected multiple control unit to a second multiple control unit.

27. The method of claim 22 further including the step of moving said audio conference from said selected multiple control unit to a second multiple control unit.

28. The method of claim 22 further including the steps of:
providing said audio conference to a streaming protocol server from said selected multiple control unit;
connecting a passive participant to said streaming protocol server; and
broadcasting said audio conference from said streaming protocol server to a passive participant.

29. A large-scale fault-tolerant audio conferencing method in a purely packet-switched network, said method comprising the steps of:
initiating a call from an endpoint to a conference gatekeeper in a gatekeeper cloud;
querying a conference allocation and control system from said conference gatekeeper for routing instructions for an audio conference;
determining in said conference allocation and control system whether the call from said endpoint contains adequate information to establish said audio conference;
responding from said conference allocation and control system to said endpoint with routing instructions to an interactive voice response server when there is other than said adequate information to establish said audio conference;
connecting said endpoint to said interactive voice response server when there is other than said adequate information to route said call and:
  gathering in said interactive voice response server adequate information to establish said audio conference; and
  transferring said adequate information to the conference allocation and control system;
  determining in said conference allocation and control system the status of said audio conference;
  selecting in said conference allocation and control system a conference multiple control unit from a multiple control unit pool, said conference multiple control unit hosting said audio conference when said status of said audio conference is inactive;
  selecting in said conference allocation and control system a conference multiple control unit from a multiple control unit pool, said conference multiple control unit hosting said audio conference when said status of said audio conference is active;
  responding from said conference allocation and control system to said endpoint with said queried routing instructions, said queried routing instructions indicating said selected multiple control unit;
  transferring said endpoint from said interactive voice response server to said audio conference at said selected conference multiple control unit when there is other than said adequate information to route the call;
  connecting said endpoint to said audio conference at said conference multiple control unit when there is adequate information to route the call, once said endpoint is connected to said audio conference, said audio conference:
    supporting full service conferencing in said audio conference to said endpoint with a reservation system and a call agent;
    supporting dynamically routed audio signals within said packet-switched network;
    supporting passive participants in said packet-switched network;
    supporting dial out from said audio conference to an additional endpoint.

* * * * *